G. F. CONNER.
ACTUATING MECHANISM FOR AGRICULTURAL MACHINES.
APPLICATION FILED FEB. 13, 1908.
998,752.  Patented July 25, 1911.
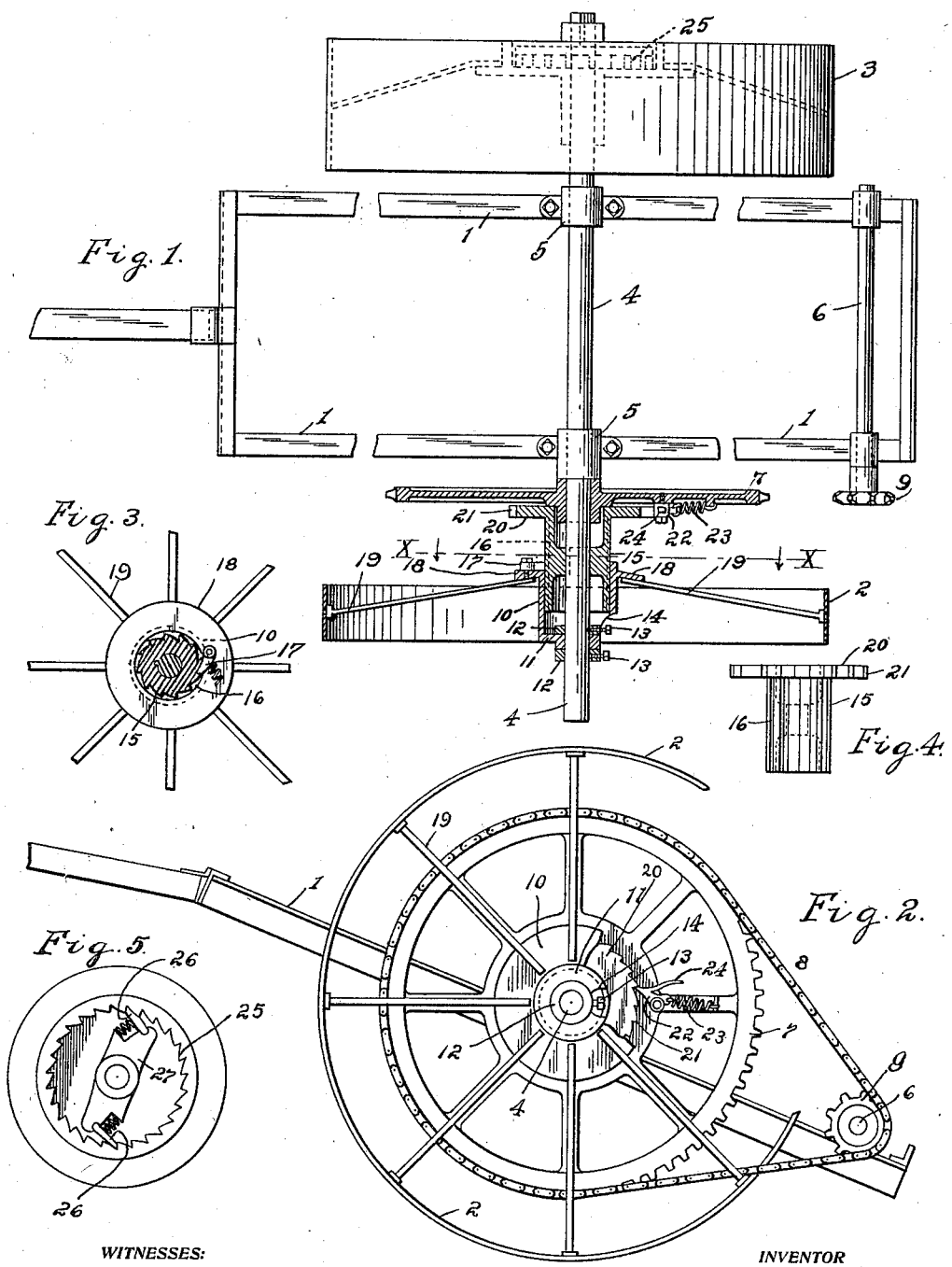
WITNESSES:
Walter A. Greenburg
C. R. Stickney
INVENTOR
GEORGE F. CONNER
BY 
ATTORNEY

UNITED STATES PATENT OFFICE.

GEORGE F. CONNER, OF PORT HURON, MICHIGAN.

ACTUATING MECHANISM FOR AGRICULTURAL MACHINES.

998,752.

Specification of Letters Patent.    Patented July 25, 1911.

Application filed February 13, 1908. Serial No. 415,747.

*To all whom it may concern:*

Be it known that I, GEORGE F. CONNER, a citizen of the United States of America, residing at Port Huron, in the county of St. Clair and State of Michigan, have invented certain new and useful Improvements in Actuating Mechanism for Agricultural Machines, of which the following is a specification, reference being had therein to the accompanying drawings.

In agricultural machines for various purposes, and especially for root-working and harvesting where the machine is actuated by the traction wheels carrying it and is drawn along the rows successively across the field, it is necessary that the traction wheels be adjustable laterally to accommodate the machine to different widths of rows, so that the inner wheel may run between the rows, the outer wheel usually going over the previously tilled row, or outside of it.

This invention relates to a traction wheel for root harvesting and agricultural field machines which is adjustable laterally in the machine without reference to the driving mechanism.

The invention consists in the matters hereinafter set forth, and more particularly pointed out in the appended claims.

In the drawings, Figure 1 is a plan view, partially in section and broken away, of a machine provided with a traction wheel which embodies features of the invention. Fig. 2 is a side view, partially broken away, of the machine. Fig. 3 is an end view in section on line *x—x* of Fig. 1 in detail of the inner member of a telescoping hub, together with the interlocking dog of the corresponding outer member in operative position. Fig. 4 is a view in elevation of the inner member or barrel. Fig. 5 is a view in end elevation of a hub with interior ratchets.

For purpose of ready illustration, a machine of the sulky type is herein shown wherein a main frame 1 is supported by a pair of traction wheels 2 and 3 which are journaled on a main shaft 4, itself rotatable in suitable bearings 5 on the frame; whatever mechanism there may be is operated from a counter-shaft 6 journaled at an appropriate point on the frame and connected to the main shaft by a sprocket wheel 7 rotatable on the main shaft, a sprocket chain 8 and a counter-sprocket 9.

The wheel 2 adjacent the drive sprocket 7 has an outer hub 10 secured by the usual spoke or web construction to the wheel rim. The hub is a hollow cylinder whose outer end wall 11 has sliding and rotatable engagement with the shaft, stop-collars 12 with set-screws 13 holding it where desired, the set screw of the inner collar being accessible through a hand hole 14 in the hub. The body of the outer hub telescopes over and is rotatable on an inner hub or barrel 15 keyed or otherwise made fast to the shaft adjacent the main drive sprocket. Longitudinal flutes 16 in the barrel periphery are engaged by a spring-pressed dog 17 pivoted on the inner end of the outer hub 10, a convenient place therefor in the construction herein illustrated being afforded by a flange 18 to which the wheel spokes 19 are attached. If it was only desired to turn the main shaft, no other means are needed. The inner end of the barrel preferably embraces an outwardly projecting portion of the sprocket hub to form a joint that prevents the entrance of dirt into the barrel at this point. To operate the main driving sprocket wheel 7, a circular flange 20 on the adjacent end of the barrel has peripheral teeth 21 which may be engaged by a pawl 22 pivoted on the sprocket wheel, a spring 23 holding the pawl normally against the teeth, or out of contact therewith when the pawl is fully retracted, a finger 24 affording ready means for throwing the parts out of gear. The other wheel 3 may have a two-part telescoping hub of the same general type. One adjustable wheel is found to afford range of adjustment sufficient for ordinary requirements, however, and accordingly the fixed wheel 3 may have any ratchet connection with the axle in order to give the necessary compensating drive in turning corners and the like. As an example, internal ratchet teeth 25 in the wheel hub may be engaged by spring pressed detents 26 on opposite ends of a spider 27 keyed or made fast to the shaft. The adjustable wheel may thus be set in or out from the sprocket wheel or the other working parts of the machine by loosening the set screws of the collars and moving the hub on the shaft to the spot desired, the dog sliding along the flute of the barrel and the collars being readily adjusted and secured in place. Thus the main driving mechanism of the machine is not disturbed and the main drive sprocket does not have to be shifted as in the ordinary construction. The inner barrel forms a bearing for the wheel and the parts are rigidly in line at all times.

While the wheel is especially adapted for root working and cultivating machines such as beet toppers and harvesters, row cultivators and the like, it may be used in any place where a laterally adjustable traction wheel is desired.

Obviously the details of construction may be varied without departing from the spirit of the invention, and I do not care to limit myself to any particular form or arrangement of parts.

What I claim as my invention is:—

1. In agricultural field machines, a main frame, a shaft rotatable therein, a sprocket wheel secured to the shaft, a traction bearing wheel, a hub therefor consisting of a hollow cylinder with an outer end wall in rotatable and sliding engagement with the main shaft, stop collars adjustable on the shaft between which the end wall of the hub is secured, the body of the hub having an opening adjacent the inner stop collar, an outer peripheral flange on the inner end of the hub, spokes connecting said flange with the wheel rim, a barrel having a central wall secured to the shaft and an outer fluted periphery in telescoping engagement with the traction wheel hub, a spring pawl on the spoke flange of the wheel hub engaging the flutes of the barrel periphery, a circular flange on the barrel adjacent the sprocket wheel provided with peripheral teeth, and a pawl on the sprocket wheel adapted to be thrown into engagement with the teeth.

2. In agricultural field machines, a main frame, a shaft rotatable therein, a sprocket wheel secured to the shaft having an outwardly extending hub, a traction bearing wheel, a hub therefor consisting of a hollow cylinder with an outer end wall in rotatable and sliding engagement with the main shaft, stop collars adjustable on the shaft between which the end wall of the hub is secured, the body of the hub having an opening adjacent the inner stop collar, an outer peripheral flange on the inner end of the hub, spokes connecting said flange with the wheel rim, a barrel having a central wall secured to the shaft and an outer fluted periphery in telescoping engagement with the traction wheel hub, a spring pawl on the spoke flange of the wheel hub engaging the flutes of the barrel periphery, a circular flange on the barrel adjacent the sprocket wheel provided with peripheral teeth, and a pawl on the sprocket wheel adapted to be thrown into engagement with the teeth, the end of the hub adjacent the sprocket wheel telescoping over the outwardly projecting portion of the sprocket wheel hub.

In testimony whereof I affix my signature in presence of two witnesses.

GEORGE F. CONNER.

Witnesses:
C. R. STICKNEY,
OTTO F. BARTHEL.

Copies of this patent may be obtained for five cents each, by addressing the "Commissioner of Patents, Washington, D. C."